United States Patent
Shoyama

(10) Patent No.: US 8,199,233 B2
(45) Date of Patent: Jun. 12, 2012

(54) SOLID-STATE IMAGING DEVICE AND CAMERA CAPABLE OF CORRECTING SHADING OF A CAPTURED IMAGE

(75) Inventor: Hideki Shoyama, Fukuoka (JP)

(73) Assignee: Sony Corporation, Tokyo (JP)

( * ) Notice: Subject to any disclaimer, the term of this patent is extended or adjusted under 35 U.S.C. 154(b) by 394 days.

(21) Appl. No.: 12/461,451

(22) Filed: Aug. 12, 2009

(65) Prior Publication Data

US 2010/0060766 A1    Mar. 11, 2010

(30) Foreign Application Priority Data

Sep. 5, 2008    (JP) ................. 2008-227763

(51) Int. Cl.
*H04N 3/14* (2006.01)
*H01L 27/00* (2006.01)

(52) U.S. Cl. ........ 348/296; 348/251; 348/302; 348/308; 250/208.1

(58) Field of Classification Search .................. 348/308, 348/310, 297, 296
See application file for complete search history.

(56) References Cited

U.S. PATENT DOCUMENTS

| 6,483,541 B1 | 11/2002 | Yonemoto et al. |
| 6,867,850 B2 * | 3/2005 | McClurg et al. ............. 356/71 |
| 7,623,689 B2 * | 11/2009 | Shigeta .................. 382/124 |

FOREIGN PATENT DOCUMENTS

| JP | 09-069980 | 3/1997 |
| JP | 10-126697 | 5/1998 |

* cited by examiner

*Primary Examiner* — Ngoc-Yen Vu
(74) *Attorney, Agent, or Firm* — Rader Fishman & Grauer, PLLC

(57) ABSTRACT

A solid-state imaging device includes a pixel array unit in which pixels having photoelectric converting elements configured to accumulate electric signals in accordance with the quantity of received light and detecting units configured to detect the electric signals accumulated using the photoelectric converting elements are arrayed in a matrix and a timing signal generator configured to generate a timing signal with which an electric signal accumulation time period of each of respective pixels constituting the pixel array unit is set to be a time period obtained by adding a time period calculated on the basis of a position where each of the respective pixels constituting the pixel array unit is arranged to a predetermined time period.

4 Claims, 8 Drawing Sheets

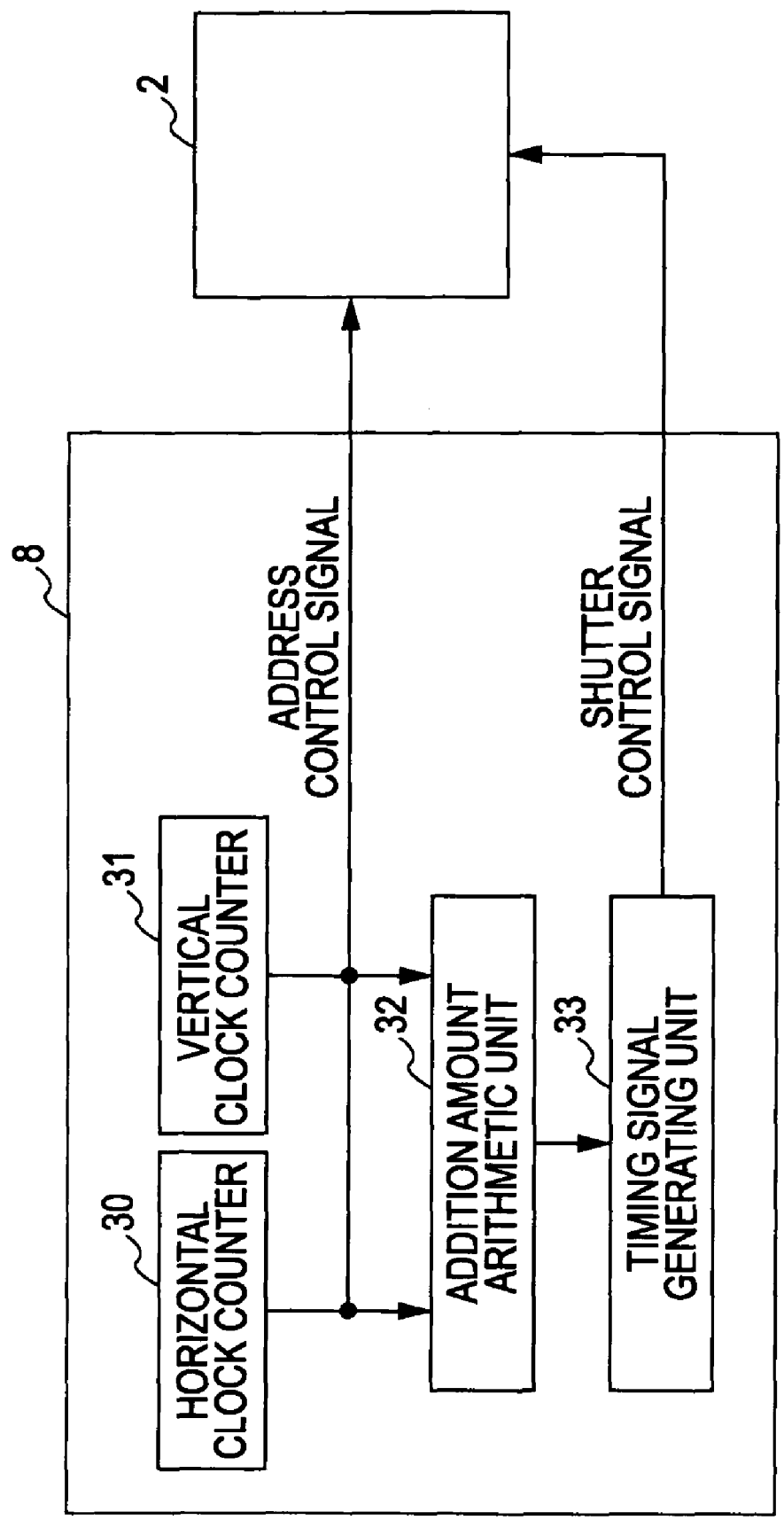

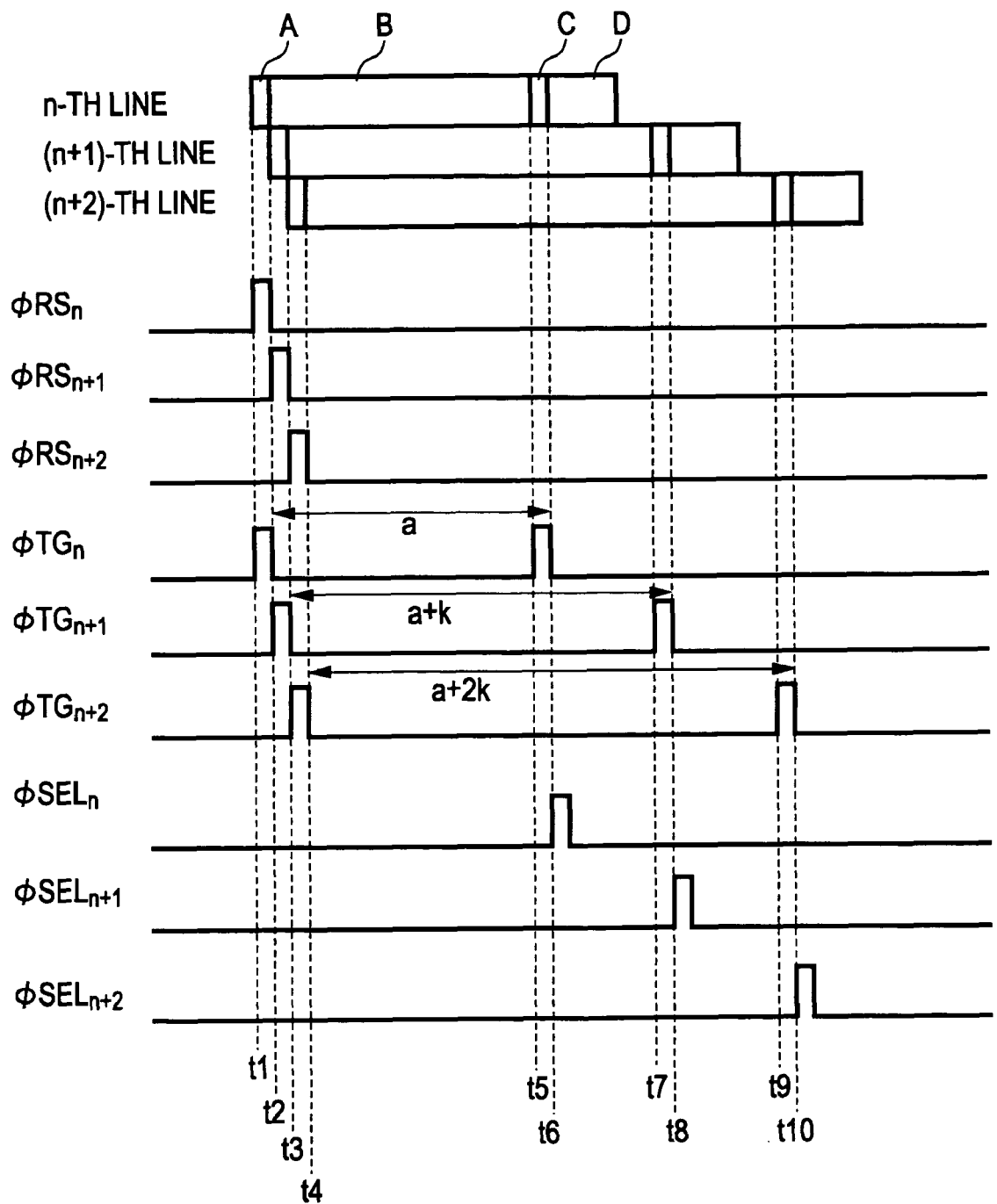

SOLID-STATE IMAGING DEVICE AND CAMERA CAPABLE OF CORRECTING SHADING OF A CAPTURED IMAGE

BACKGROUND OF THE INVENTION

1. Field of the Invention

The present invention relates to a solid-state imaging device and a camera. More specifically, the present invention relates to a solid-state imaging device capable of correcting shading of a picked-up (or captured) image and a camera using the solid-state imaging device of the above mentioned type.

2. Description of the Related Art

Nowadays, solid-state imaging devices such as CMOS type image sensors are being widely used as image input devices of imaging apparatuses mounted on various mobile terminal appliances such as mobile phones and of imaging apparatuses such as digital still cameras and digital video cameras (for example, see Japanese Patent Laid-Open Publication No. 10-126697).

FIG. 6 is a schematic diagram illustrating a CMOS type image sensor. The CMOS type image sensor includes a pixel array unit 202 in which many pixels 201 having photoelectric converting elements are arrayed in a matrix and a vertical scanning circuit 203 configured to select the pixels in the pixel array unit on a row by row (line by line) basis to control a shutter-releasing operation and a reading-out operation of each pixel. The image sensor also includes a column signal processing unit 204 configured to read out signals from the pixel array unit on a row by row basis and to perform predetermined signal processing operations (for example, a CDS process, an AGC process and an analog-to-digital converting process) on the signals on a column by column basis. The image sensor further includes a horizontal scanning circuit 206 configured to select the signals from the column signal processing unit on a signal by signal basis to guide the selected signal to a horizontal signal line 205 and a signal processing unit 207 configured to convert the signal sent from the horizontal signal line into data of an intended output form. The image sensor further includes a timing generator 208 configured to supply various pulse signals necessary for execution of operations of respective units on the basis of a reference clock. Incidentally, the CDS process is a process of removing fixed pattern noise induced by the variation in threshold values of transistors constituting each pixel and ADC process is an automatic gain controlling process.

As shown in FIG. 7, each of the pixels 201 arranged in the pixel array unit has a circuit configuration including a transfer transistor 102, a reset transistor 103, an amplification transistor 104 and a selection transistor 105, in addition to a photoelectric converting element (for example, a photodiode) 101. FIG. 7 shows an example of a circuit using N-channel type MOS transistors as the transistors 102 to 105.

The transfer transistor 102 is connected between a cathode electrode of the photodiode 101 and an FD (floating diffusion) unit 106 and a gate electrode of the transfer transistor 102 is connected to a transfer control line 111 to which a transfer gate pulse TG is applied. A drain electrode of the reset transistor 103 is connected to a power source Vdd, its source electrode is connected to the FD unit 106 and its gate electrode is connected to a reset control line 112 to which a reset pulse RS is applied.

A gate electrode of the amplification transistor 104 is connected to the FD unit 106, its drain electrode is connected to the power source Vdd and its source electrode is connected to a drain electrode of the selection transistor 105. A gate electrode of the selection transistor 105 is connected to a selection control line 113 to which a selection pulse SEL is applied and its source electrode is connected to a vertical signal line 216. The vertical signal line 216 is connected to a constant-current source 217 configured to supply a constant current to the vertical signal line 216 and is also connected to the column signal processing unit 204.

FIG. 8 is a schematic diagram illustrating a sectional structure of pixel constitutional parts other than the amplification transistor 104 and the selection transistor 105.

N-type diffusion regions 132, 133 and 134 are formed on a surface layer of a P-type substrate 131. A gate electrode 135 is formed above a part of the P-type substrate 131 between the N-type diffusion regions 132 and 133 and a gate electrode 136 is also formed above a part of the P-type substrate 131 between the N-type diffusion regions 133 and 134 respectively via gate oxide ($SiO_2$) films not shown.

In a corresponding relation between the examples shown in FIGS. 7 and 8, the photodiode 101 is formed by P-N junction between the P-type substrate 131 and the N-type diffusion region 132. The transfer transistor 102 is constituted by the N-type diffusion region 132, the N-type diffusion region 133 and the gate electrode 135 formed above the part between the regions 132 and 133. The reset transistor 103 is constituted by the N-type diffusion region 133, the N-type diffusion region 134 and the gate electrode 136 formed above the part between the regions 133 and 134.

The N-type diffusion region 133 constitutes the FD unit 106 and is electrically connected to the gate electrode of the amplification transistor 104. A supply potential is applied from the power source Vdd to the N-type diffusion region 134 acting as a drain electrode of the reset transistor 103. A light-shielding layer 137 is laid over the upper surface of the P-type substrate 131 except a part on which the photodiode 101 is formed.

Next, a circuit operation of the pixel 201 will be described with reference to a wave-form chart in FIG. 9. In FIG. 9, $\phi RS_n$ is a reset pulse on an n-th line, $\phi TG_n$ is a transfer gate pulse on the n-th line and $\phi SEL_n$ is a selection pulse on the n-th line. Also, in FIG. 9, A is a resetting operation duration, B is an accumulating operation duration, C is a transferring operation duration and D is a reading-out operation duration.

In the pixel on the n-th line, first, the reset pulse $RS_n$ to be applied to the reset transistor 103 and the transfer gate pulse $TG_n$ to be applied to the transfer transistor 102 are set at high levels (H levels) for a time period between times t31 and t32. As a result, useless charges accumulated in the photodiode 101 and the FD unit of the pixel on the n-th line are removed (a resetting operation).

Next, at the time t32, the reset pulse $RS_n$ to be applied to the reset transistor 103 and the transfer gate pulse $TG_n$ to be applied to the transfer transistor 102 are set at low levels (L levels). As a result, accumulation of signal charges which have been photoelectric-converted using the photodiode 101 of the pixel on the n-th line is started (an Then, at a time t34, the transfer gate pulse $TG_n$ to be applied to the transfer transistor 102 is set at the H level to start an operation of transferring the signal charges from the photodiode 101 to the FD unit 106. Then, at a time t35, the transfer gate pulse TGn is set at the L level to terminate the operation of transferring the signal charges from the photodiode 101 to the FD unit 106 (a transferring operation). Incidentally, a time period from the time t32 to the time t35 is set as a time period for which the signal charges are accumulated in a pixel (hereinafter, referred to as a signal charge accumulation time period of the pixel) on the n-th line.

When the selection pulse $SEL_n$ to be applied to the selection transistor 105 is set at the H level at the completion of the signal charge transferring operation in the pixel on the n-th line, the signal charge held in the FD unit 105 is converted into a voltage signal to be output (a reading-out operation).

In the pixel on the (n+1)-th line, the resetting operation, the accumulating operation, the transferring operation and the reading-out operation are performed at timings different from those of the operations of the pixel on the n-th line.

Specifically, a reset pulse $RS_{(n+1)}$ to be applied to the reset transistor 103 and a transfer gate pulse $TG_{(n+1)}$ to be applied to the transfer transistor 102 are set at the H levels for a time period between the times t32 and t33. As a result, useless charges accumulated in the photodiode 101 and the FD unit 106 of the pixel on the (n+1)-th line are removed.

Next, at the time t33, the reset pulse $RS_{(n+1)}$ to be applied to the reset transistor 103 and the transfer gate pulse $TG_{(n+1)}$ to be applied to the transfer transistor 102 are set at the L levels. As a result, accumulation of signal charges which have been photoelectric-converted using the photodiode 101 of the pixel on the (n+1)-th line is started.

Then, at a time t35, the transfer gate pulse $TG_{(n+1)}$ to be applied to the transfer transistor 102 is set at the H level to start the operation of transferring the signal charges from the photodiode 101 to the FD unit 106. At a time t36, the transfer gate pulse $TG_{(n+1)}$ is set at the L level to terminate the operation of transferring the signal charges from the photodiode 101 to the FD unit 106. Incidentally, a time period from the time t33 to the time t36 is set as a signal charge accumulation time period of the pixel on the (n+1)-th line.

When a selection pulse SEL(n+1) to be applied to the selection transistor 105 is set at the H level at the completion of the operation of transferring the signal charges in the pixel on the (n+1)-th line, the signal charge held in the FD unit 106 is converted into a voltage signal to be output.

In an existing CMOS type image sensor, signal charge accumulation time periods are the same as one another among pixels regardless of to which row the pixel concerned belongs. For example, the time period between the times t32 and t35 which is the signal charge accumulation time period of the pixel on the n-th line is the same as the time period between the times t33 and t36 which is the signal charge accumulation time period of the pixel on the (n+1)-th line.

Incidentally, in a camera system using a solid-state imaging device such as a CMOS type image sensor, in a peripheral area of the pixel array unit (a light receiving region) of the solid-state imaging device, incident light sent from an optical system is not vertically incident on the solid-state imaging device and is incident on the device at a predetermined angle. As a result, shading that the sensitivity attained in the peripheral area of the pixel array unit (the light receiving region) of the solid-state imaging device is lower than that attained in a central area of the pixel array unit (the light receiving region) of the solid-state imaging device may occur.

In order to prevent the shading as mentioned above, there has been proposed a method in which an output signal obtained from each pixel is converted into digital data and is then subjected to arithmetic operations to correct the shading (for example, see Japanese Laid-Open Patent Publication No. 09-69980).

SUMMARY OF THE INVENTION

However, in the above mentioned shading correcting method described in Japanese Laid-Open Patent Publication No. 09-69980, due to the arithmetic operations performed on the digital data, rounding error may occur and an arithmetic operation such as a multiplication may cause to increase noise. Thus, although the shading is corrected, the quality of a picked-up (captured) image may be adversely affected.

The present invention has been made in view of the above mentioned circumstances. Therefore, it is desirable to provide a solid-state imaging device and a camera capable of correcting shading without adversely affecting the quality of the picked-up (captured) image.

According to an embodiment of the present invention, there is provided a solid-state imaging device including a pixel array unit in which pixels having photoelectric converting elements configured to accumulate electric signals in accordance with the quantity of received light and detecting units configured to detect the electric signals accumulated using the photoelectric converting elements are arrayed in a matrix, and a timing signal generator configured to generate a timing signal with which an electric signal accumulation time period of each of the respective pixels constituting the pixel array unit is set to be a time period obtained by adding a time period calculated on the basis of a position where each of the respective pixels constituting the pixel array unit is arranged to a predetermined time period.

According to an embodiment of the present invention, by generating the timing signal with which the electric signal accumulation time period of each of the respective pixels constituting the pixel array unit is set to be the time period obtained by adding the time period calculated on the basis of the position where each of the respective pixels constituting the pixel array unit is arranged to the predetermined time period, the electric signal accumulation time period of each pixel may be changed in accordance with the position where the pixel concerned is arranged. Thus, the accumulation time period of a pixel of a low condensing efficiency may be increased to correct the shading.

According to an embodiment of the present invention, there is provided a camera including a pixel array unit in which pixels having photoelectric converting elements configured to accumulate electric signals in accordance with the quantity of received light and detecting units configured to detect the electric signals accumulated using the photoelectric converting elements are arrayed in a matrix, an optical system configured to guide incident light to the pixel array unit and a timing signal generator configured to generate a timing signal with which an electric signal accumulation time period of each of the respective pixels constituting the pixel array is set to be a time period obtained by adding a time period calculated on the basis of a position where each of the respective pixels constituting the pixel array unit is arranged to a predetermined time period.

According to an embodiment of the present invention, by generating the timing signal with which the electric signal accumulation time period of each of the respective pixels constituting the pixel array unit is set to be the time period obtained by adding the time period calculated on the basis of the position where each of the respective pixels constituting the pixel array unit is arranged to the predetermined time period, the electric signal accumulation time period of each pixel may be changed in accordance with the position where the pixel concerned is arranged. Thus, the accumulation time period of a pixel of a low condensing efficiency may be increased to correct the shading.

In the solid-state imaging device and the camera according to embodiments of the present invention, the shading may be corrected without adversely affecting the quality of the picked-up (captured) image.

BRIEF DESCRIPTION OF THE DRAWINGS

FIG. 3 is a schematic diagram illustrating a configuration of a timing generator according to an embodiment of the present invention;

FIG. 5 is a schematic diagram illustrating an operation of a CMOS type image sensor according to an embodiment of the present invention;

DESCRIPTION OF THE PREFERRED EMBODIMENTS

Next, for the purpose of understanding the present invention, preferred embodiments of the present invention will be described with reference to the accompanying drawings.

Figure 1:
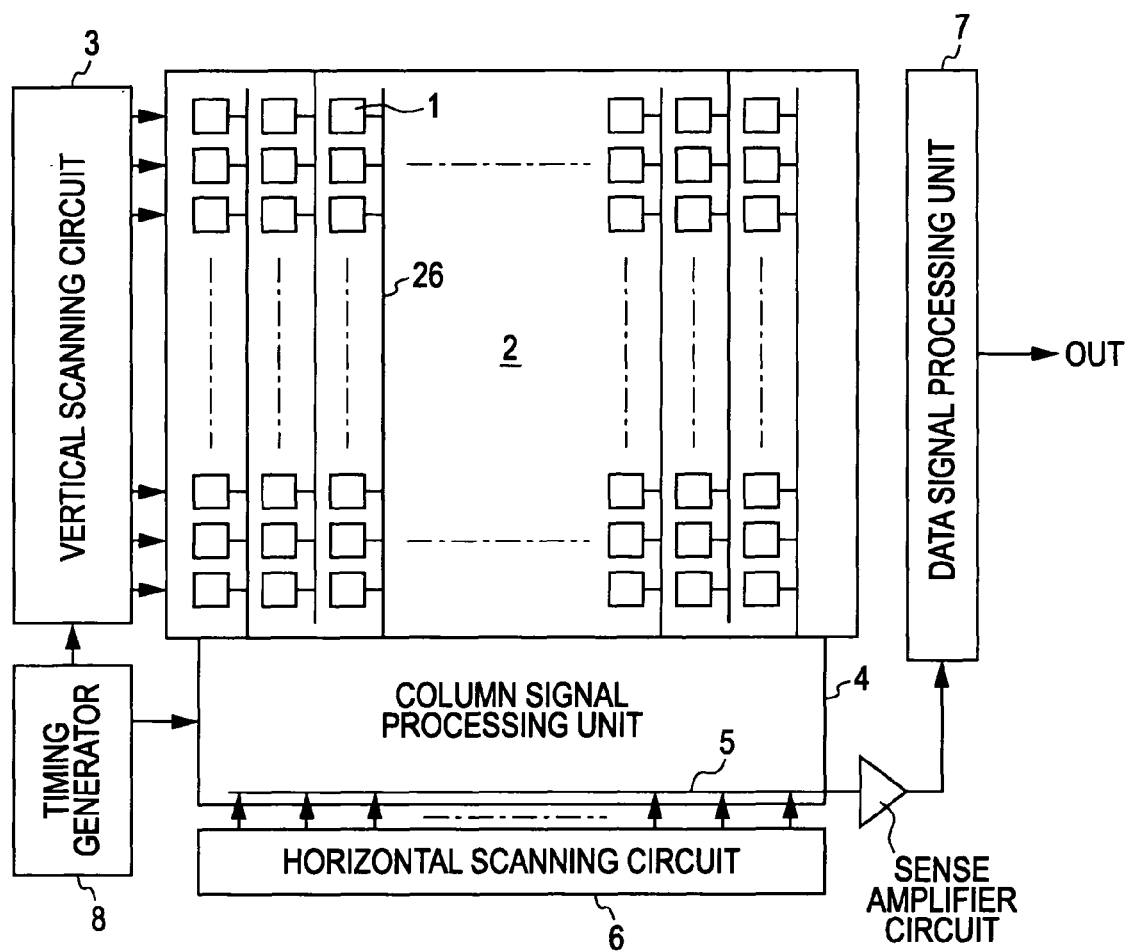
FIG. 1 is a schematic diagram illustrating a CMOS type image sensor according to an embodiment of the present invention.

FIG. 1 is a schematic diagram illustrating a CMOS type image sensor which is an example of a solid-state imaging device according to an embodiment of the present invention. In the example shown in FIG. 1, the CMOS type image sensor includes a pixel array unit 2 in which many pixels 1 having photoelectric converting elements are arrayed in a matrix and a vertical scanning circuit 3 configured to select the pixels in the pixel array unit on a row by row (a line by line) basis to control a shutter-releasing operation and a reading-out operation of each pixel. The sensor also includes a column signal processing unit 4 configured to read out signals from the pixel array unit on a row by row (a line by line) basis to perform predetermined signal processing operations (for example, a CDS process, AGC process and an analog-to-digital converting process) on the signals on a column by column basis. The sensor further includes a horizontal scanning circuit 6 configured to select the signal so subjected to column signal processing on a signal by signal basis to guide the selected signal to a horizontal signal line 5, a data signal processing unit 7 configured to perform data conversion on a signal on the horizontal signal line so as to have an intended output form and a timing generator 8 configured to supply various pulses necessary for operations performed using respective units on the basis of a reference clock. Note that the timing generator is an example of a timing signal generator.

Figure 2:
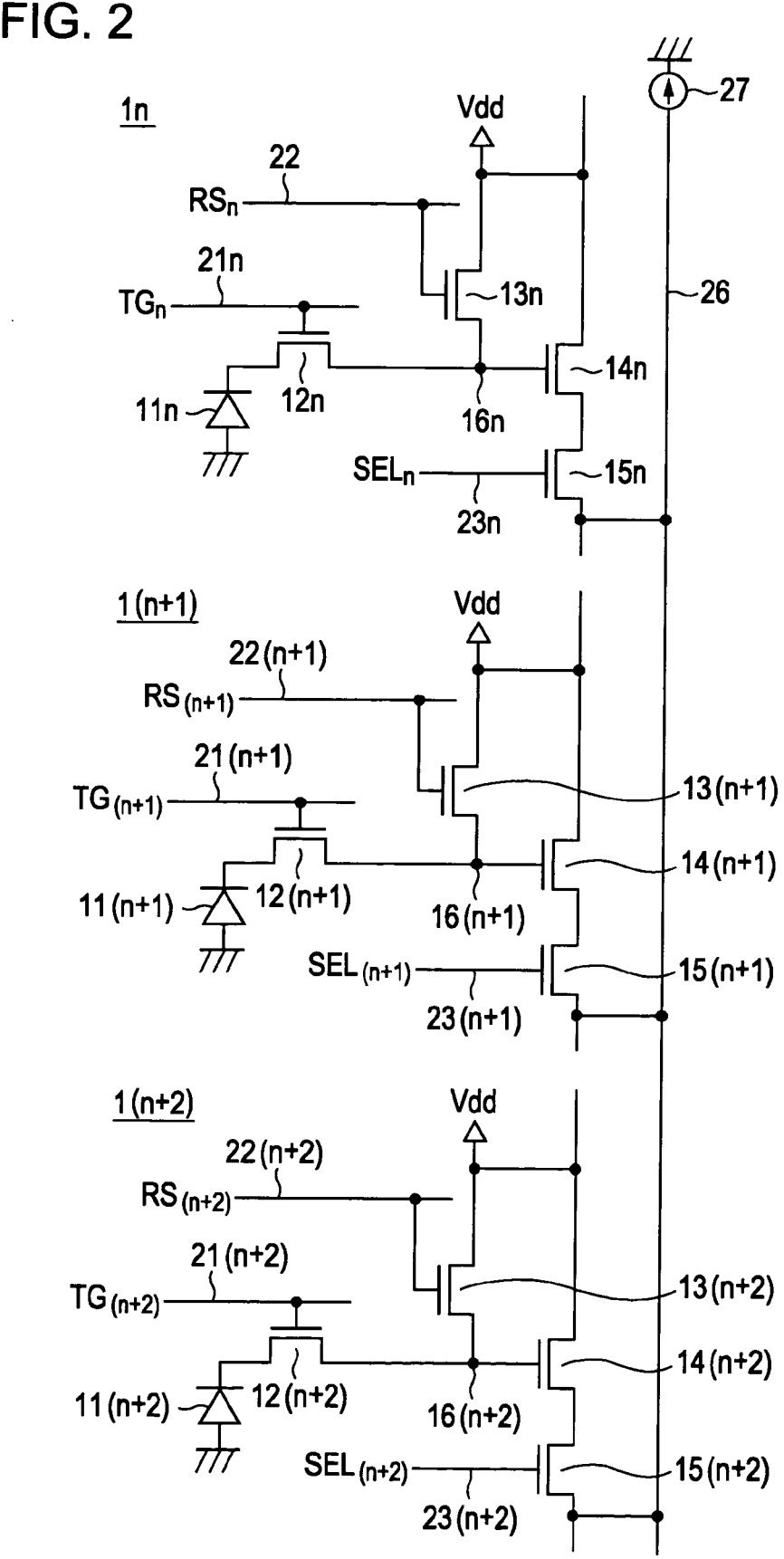
FIG. 2 is a schematic diagram illustrating a pixel array unit according to an embodiment of the present invention.

In the example shown in FIG. 1, respective pixels 1(1n to 1(n+2)) in the pixel array unit have photoelectric converting elements (for example, photodiodes) 11 (11n to 11(n+2)) and transfer transistors 12 (12n to 12(n+2)) as shown in FIG. 2. The pixels 1 also have reset transistors 13 (13n to 13(n+2)), amplification transistors 14 (14n to 14(n+2)) and selection transistors 15 (15n to 15(n+2)). In an embodiment of the present invention, an example of a circuit in which N-channel MOS type transistors are used as the transistors 12 to 15 is shown. In the drawing, "n" denotes a pixel on an n-th line and (n+1) and (n+2) respectively denote a pixel on a (n+1)-th line and a pixel on a (n+2)-th line.

The transfer transistor 12 is connected between a cathode electrode of the photodiode 11 and an FD unit 16 (16n to 16(n+2)) and its gate electrode is connected to a transfer control line 21 (21n to 21(n+2)) to which a transfer gate pulse TG is applied.

A drain electrode of the reset transistor 13 is connected to a power source Vdd, its source electrode is connected to the FD unit 16 and its gate electrode is connected to a reset control line 22 (22n to 22(n+2)) to which a reset pulse RS is applied. Incidentally, the FD unit is an example of a detection unit.

A gate electrode of the amplification transistor 14 is connected to the FD unit 16, its drain electrode is connected to the power source Vdd and its source electrode is connected to a drain electrode of the selection transistor 15. A gate electrode of the selection transistor 15 is connected to a selection control line 23 (23n to 23(n+2)) to which a selection pulse SEL is applied and its source electrode is connected to a vertical signal line 26. The vertical signal line 26 is connected to a constant current source 27 configured to supply a constant current to the vertical signal line and is connected to the column signal processing unit 4.

As shown in FIG. 3, the timing generator 8 has a horizontal clock counter (hereinafter, referred to as an H counter) 30 configured to count horizontal clocks indicative of a vertical position of a pixel constituting the pixel array unit and a vertical clock counter 31 (hereinafter, referred to as a V counter) configured to count vertical clocks indicative of a horizontal position of a pixel constituting the pixel array unit. Incidentally, the H counter is an example of a first counter and the V counter is an example of a second counter.

The timing generator also has an addition amount arithmetic unit 32 configured to calculate an addition amount of horizontal clocks (hereinafter, referred to as an H addition amount) from the H (horizontal) clocks counted using the H counter 30 in accordance with the following equation (1) and to calculate an addition amount of vertical clocks (hereinafter, referred to as a V addition amount) from the V (vertical) clocks counted using the V counter 31 in accordance with the following equation (2).

$H$ addition amount=$|(H_{MAX}/2)-H$ clock$|\times H$ shading correction count: (Equation 1)

$V$ addition amount=$|(V_{MAX}/2)-V$ clock$|\times V$ shading correction count: (Equation 2)

In the equation (1), $H_{MAX}$ is the maximum value of the H counter and $|(H_{MAX}/2)-H$ clock$|$ is a deviation of a pixel from a central position in a vertical direction. Therefore, the H addition amount is calculated using the addition amount arithmetic unit 32 by multiplying an amount of deviation of the pixel from the central position in the vertical direction and the H shading correction count (constant).

Likewise, the equation 2, $V_{MAX}$ is the maximum value of the V counter and $|(V_{MAX}/2)-V$ clock$|$ is a deviation of a pixel from a central position in a horizontal direction. Therefore, the V addition amount is calculated using the addition amount arithmetic unit 32 by multiplying an amount of deviation of the pixel from the central position in the horizontal direction and the V shading correction count (constant).

The timing generator 8 further has a timing signal generating unit 33 configured to generate a timing signal from the H addition amount and the V addition amount calculated using the addition amount arithmetic unit 32.

Figure 4A:
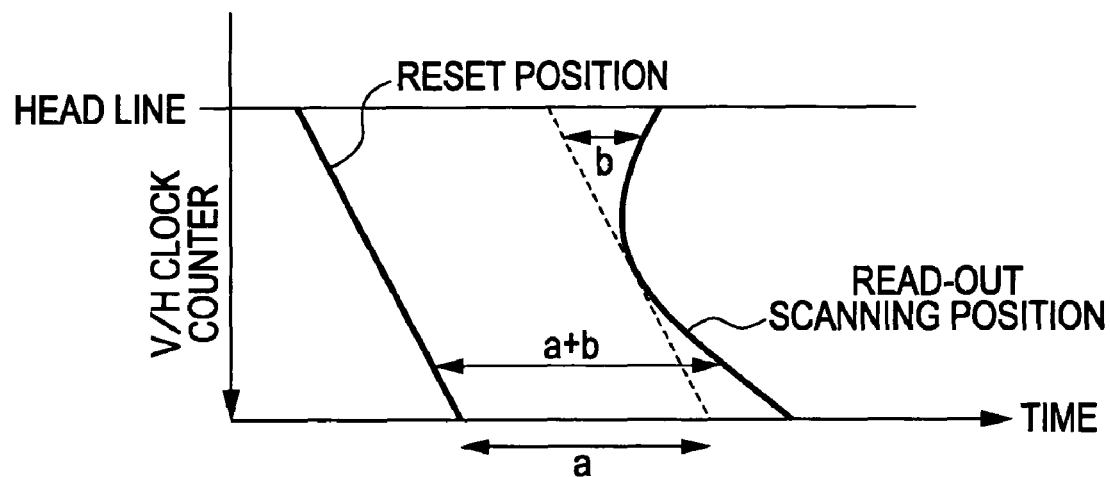
FIG. 4A is a schematic diagram illustrating a manner of adjusting an electric signal accumulation time period of a pixel according to an embodiment of the present invention.

Specifically, as shown in FIG. 4A, the timing signal generating unit 33 calculates a time period (a+b) obtained by adding the addition amount (the H addition amount and the V addition amount) designated by "b" in FIG. 4A to a predetermined time period (a fixed time period) designated by "a" in FIG. 4A as an electric signal accumulation time period of a pixel concerned.

Then, the timing signal generating unit 33 generates a timing signal used to set the transfer pulse TG with which an operation of transferring signal charges from the photodiode 11 to the FD unit 16 is terminated at the L level after the calculated accumulation time period (a+b) has elapsed from a timing at which the transfer gate pulse TG with which accumulation of electric signals is started in the pixel has been set at the L level.

In an embodiment of the present invention, the description has been made in relation to the case where the addition amount is calculated using the above mentioned equations (1) and (2) by way of example. However, the addition amount may be calculated in accordance with a position where a pixel concerned is arranged or may be calculated by other methods if correction of shading is realized. For example, in the case that shading is uniformly corrected in accordance with a distance between the center of the pixel array unit and a pixel concerned, the addition amount may be calculated by using the following equation (3).

$$\text{Addition amount} = \sqrt{\left(\frac{H_{MAX}}{2} - H \text{ clock}\right)^2 + \left(\frac{V_{MAX}}{2} - V \text{ clock}\right)^2} \quad \text{(Equation 3)}$$

Figure 4B:
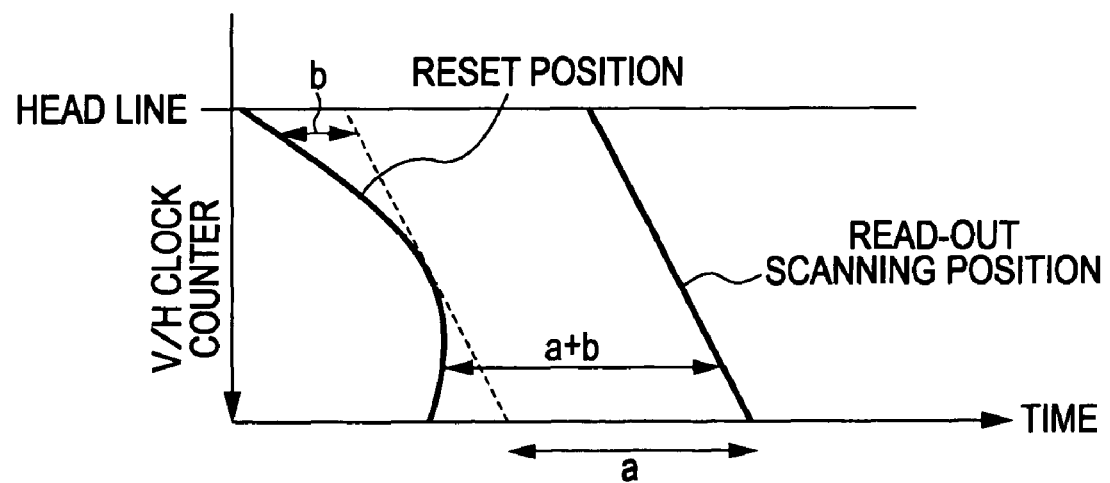
FIG. 4B is a schematic diagram illustrating a manner of adjusting an electric signal accumulation time period of a pixel according to an embodiment of the present invention.
Figure 6:
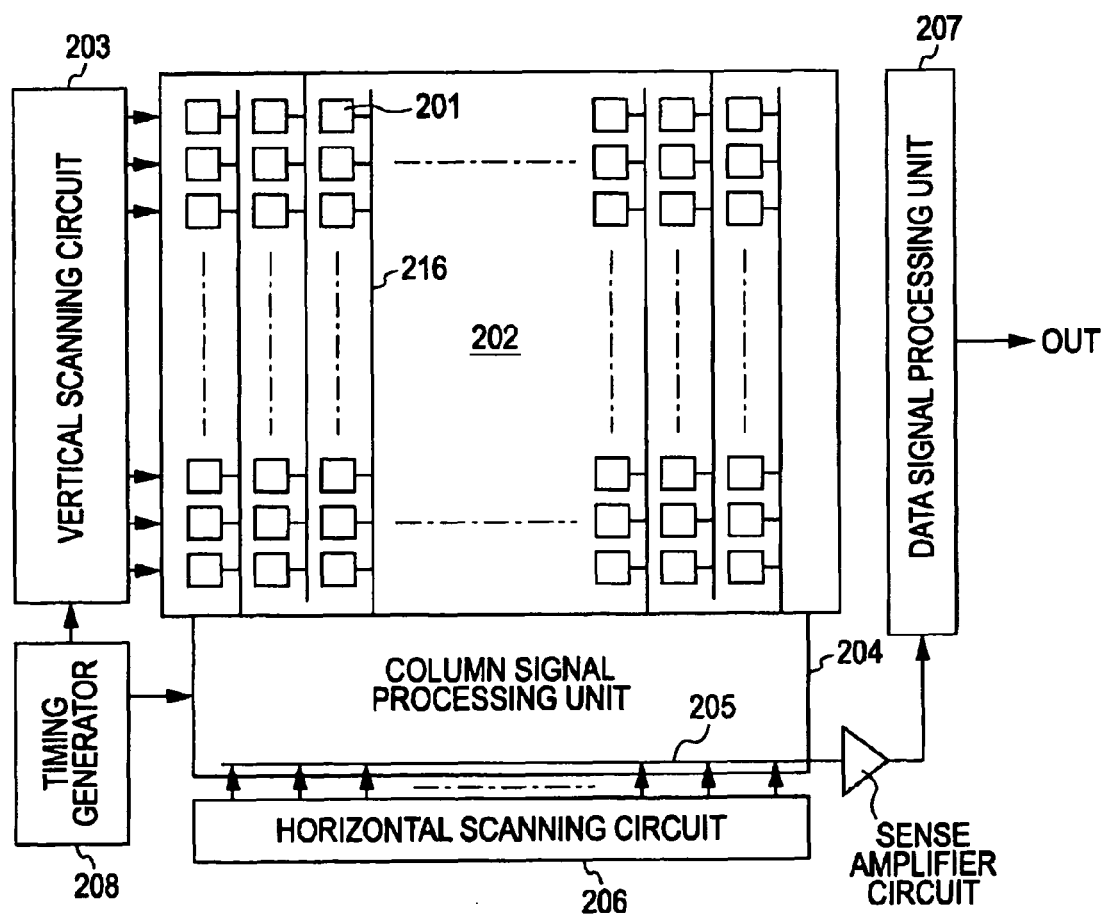
FIG. 6 is a schematic diagram illustrating an existing CMOS type image sensor.
Figure 7:
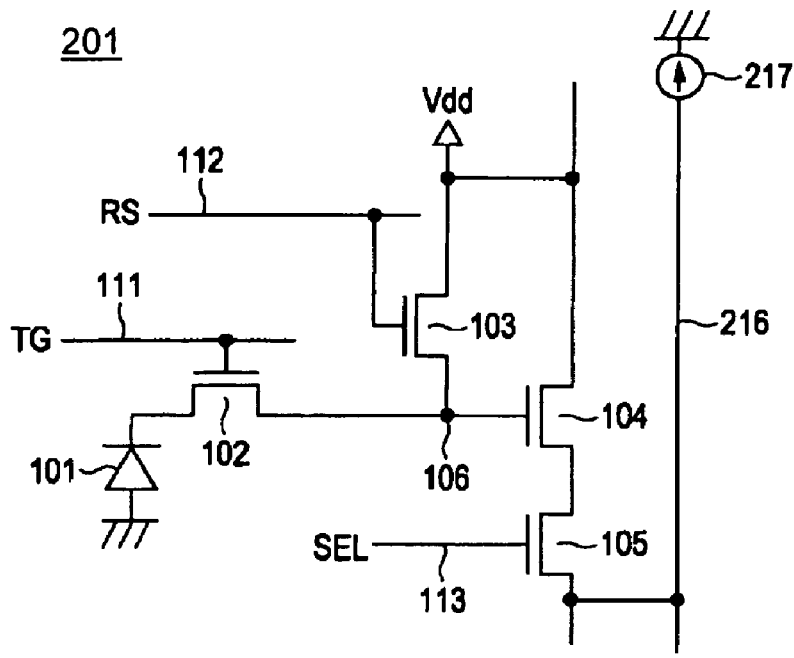
FIG. 7 is a schematic diagram illustrating an existing pixel array unit.
Figure 8:
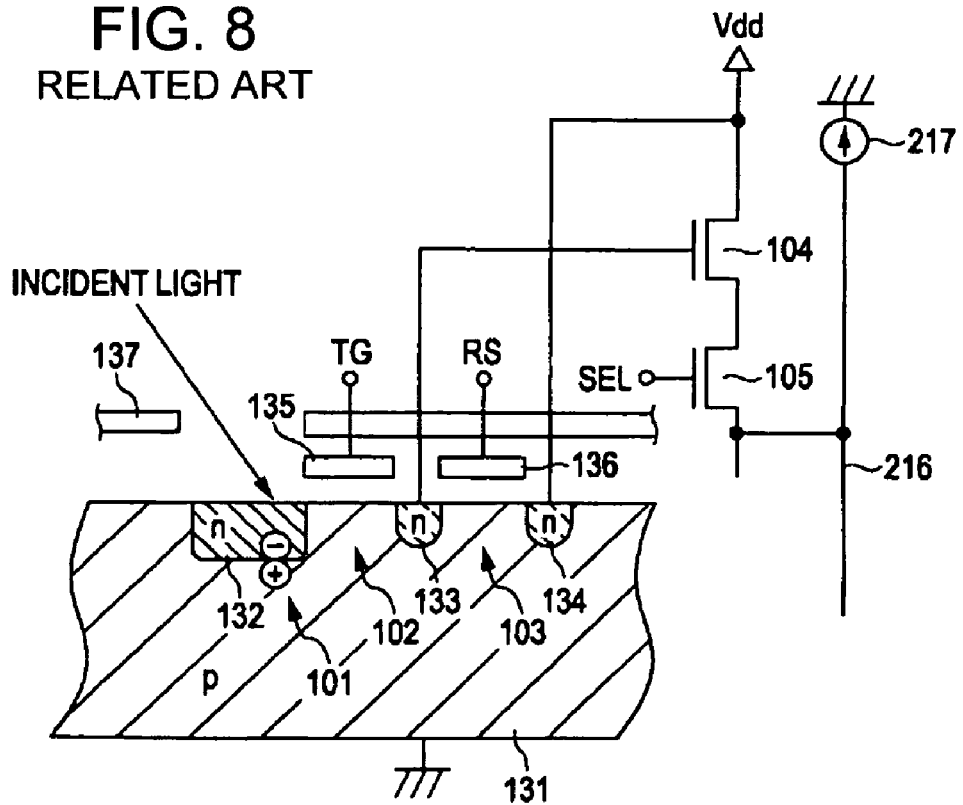
FIG. 8 is a schematic diagram of a sectional structure of pixel constitutional parts.
Figure 9:
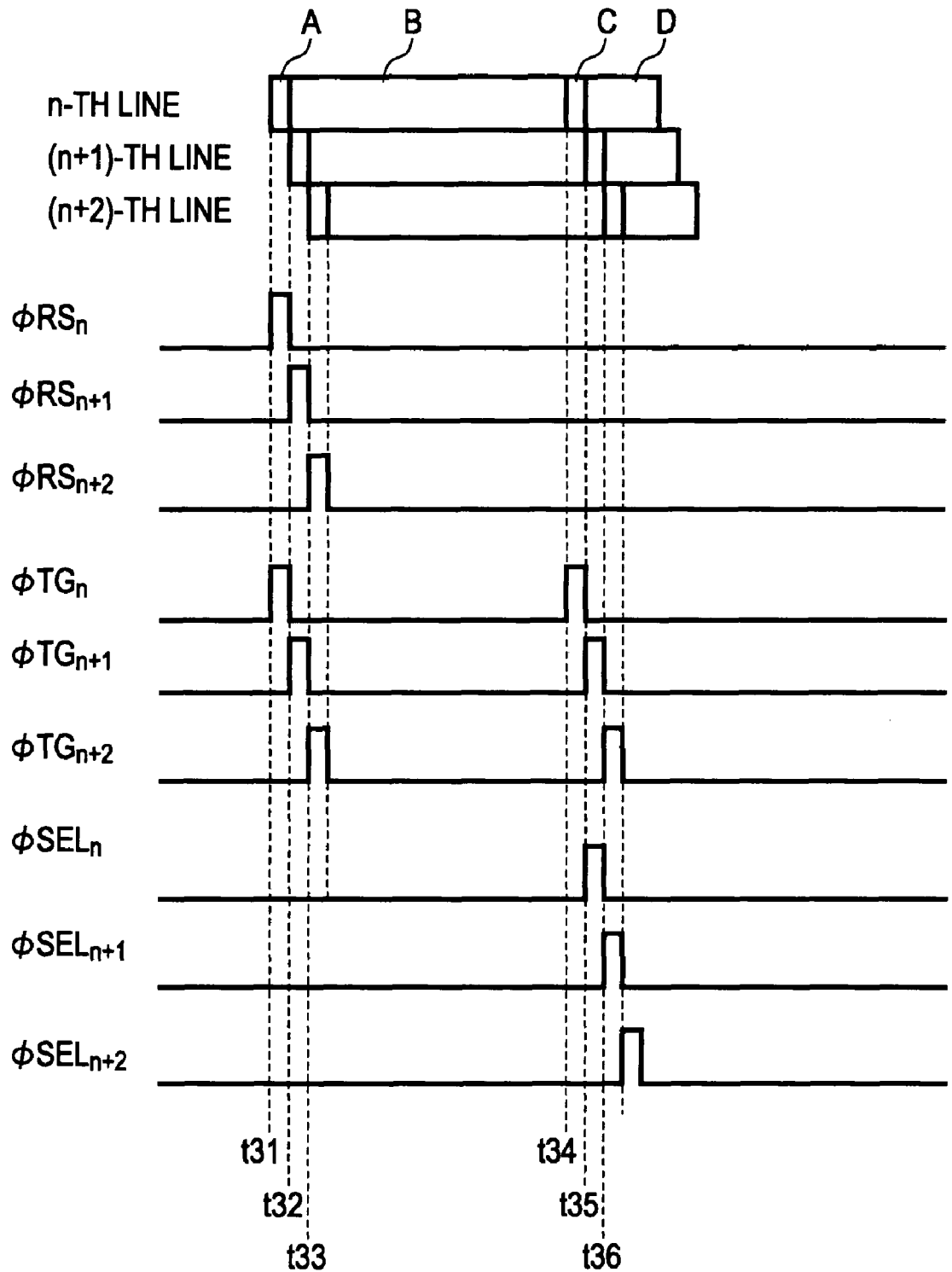
FIG. 9 is a wave-form chart illustrating a circuit operation of a pixel.

In addition, in an embodiment of the present invention, a description is made in relation to the case where the timing signal with which the transferring operation is delayed by the amount corresponding to the addition amount is generated in order to set the time period obtained by adding the addition amount "b" to the predetermined time period "a" as the electric signal accumulation time period of each pixel, by way of example. However, if the time period obtained by adding the addition amount "b" to the predetermined time period "a" can be set as the electric signal accumulation time period of each pixel, it will be sufficient for correction of shading and the transferring operation does not have to be delayed by the amount corresponding to the addition amount. Thus, as shown in FIG. 4B, the timing to start the accumulating operation may be advanced by the amount corresponding to the addition amount.

However, in the case that the timing to start the accumulating operation is advanced by the amount corresponding to the addition amount, the number of pixels in which the electric signals are reset at the same timing is increased and many useless charges are removed upon execution of resetting, so that the substrate voltage of the CMOS type image sensor may fluctuate. If the substrate voltage fluctuates, noise will generate in a picked-up (captured) image.

Therefore, in order to correct the shading while reducing the noise in the picked-up (captured) image, it is preferable to delay the transferring operation by the amount corresponding to the addition amount. Incidentally, in the case that the transferring operation is delayed by the amount corresponding to the addition amount, although the number of pixels in which the signal charges are transferred from the photodiode 11 to the FD unit 16 at the same timing is increased, the number of signal charges transferred upon execution of the transferring operation is remarkably smaller than the number of useless charges removed upon execution of the resetting operation. Thus, even though the transferring operation is delayed by the amount corresponding to the addition amount, the amount of fluctuation of the substrate voltage will be expected to be extremely smaller than that obtained in the case where the accumulating operation start timing is advanced by the amount corresponding to the addition amount.

Next, the operation of the CMOS type image sensor configured as mentioned above will be described with reference to FIG. 5. In the following, for the convenience of description, the case where signal charge accumulation time periods of respective pixels are made different from one another on a row by row basis, that is, only the H addition amount is taken into consideration and the V addition amount is not taken into consideration will be described by way of example. In addition, in the following, the description will be made assuming that $H_{MAX}$ is 2n and the H shading correction count is "k". In FIG. 5, $\phi RS_n$ is a reset pulse on an n-th line, $\phi TG_n$ is a transfer gate pulse on the n-th line, $\phi SEL_n$ is a selection pulse on the n-th line, A is a resetting operation duration, B is an accumulating operation duration, C is a transferring operation duration and D is a reading-out operation duration.

In the pixel on the n-th line, the reset pulse $RS_n$ to be applied to the reset transistor 13n and the transfer gate pulse $TG_n$ applied to the transfer transistor 12n are set at the H levels for a time period between times t1 and t2. As a result, useless charges accumulated in the photodiode 11n and the FD unit 16n of the pixel on the n-th line are removed (the resetting operation).

Then, at the time t2, the reset pulse $TS_n$ to be applied to the reset transistor 13n and the transfer gate pulse $TG_n$ to be applied to the transfer transistor 12n are set at the L levels. As a result, accumulation of signal charges which have been photoelectric-converted using the photodiode 11n of the pixel on the n-th line is started (the accumulating operation).

Then, at a time 5, the transfer gate pulse $TG_n$ to be applied to the transfer transistor 12n is set at the H level to start the operation of transferring the signal charges from the photodiode 11n to the FD unit 16n.

In the above mentioned situation, in the pixel on the n-th line, the H addition amount calculated using the addition amount arithmetic unit 32 will be "|(2n/2)−n|×k=0" from the equation (1). Thus, the timing signal generating unit 33 calculates "(a+0)=a" as an electric signal accumulation time period of the pixel on the n-th line and then generates a timing signal with which the transfer gate pulse $TG_n$ is set at the L level at a time t6 which has passed from the time t2 at which the transfer gate pulse $TG_n$ has been set at the L level by "a". Then, by applying the timing signal so generated to the pixel array unit 2, the operation of transferring signal charges from the photodiode 11n to the FD unit 16n is terminated (the transferring operation). Incidentally, a time period from the time t2 to the time t6 is set as the signal charge accumulation time period of the pixel on the n-th line.

Then, the signal charge held in the FD unit 16n is converted into a voltage signal to be output by setting the selection pulse $SEL_n$ to be applied to the selection transistor 15n at the H level after the completion of the signal charge transferring operation executed in the pixel on the n-th line (the reading-out operation).

Likewise, in the pixel on the (n+1)-line, the reset pulse $RS_{(n+1)}$ to be applied to the reset transistor 13(n+1) and the transfer gate pulse $TG_{(n+1)}$ applied to the transfer transistor 12(n+1) are set at the H levels for a time period between the times t2 and t3. As a result, useless charges accumulated in the photodiode $11(n+1)$ and the FD unit $16(n+1)$ of the pixel on the (n+1)-th line are removed.

Then, at the time t3, the reset pulse $RS_{(n+1)}$ to be applied to the reset transistor $13(n+1)$ and the transfer gate pulse $TG_{(n+1)}$ to be applied to the transfer transistor $12(n+1)$ are set at the L levels. As a result, accumulation of the signal charges which haven been photoelectric-converted using the photodiode $11(n+1)$ of the pixel on the (n+1)-th line is started.

Then, at a time t7, the transfer gate pulse TG(n+1) to be applied to the transfer transistor $12(n+1)$ is set at the H level to start the operation of transferring the signal charges from the photodiode $11(n+1)$ to the FD unit $16(n+1)$.

In the above mentioned situation, in the pixel on the (n+1)-th line, the H addition amount calculated using the addition amount arithmetic unit 32 will be "$|(2n/2)-(n+1)|\times k=k$" from the equation (1). Thus, the timing signal generating unit 33 calculates (a+k) as an electric signal accumulation time period of the pixel on the (n+1)-th line and then generates a timing signal with which the transfer gate pulse $TG_{(n+1)}$ is set at the L level at a time t8 which has passed from the time t3 at which the transfer gate pulse $TG_{(n+1)}$ has been set at the L level by (a+k). Then, by applying the timing signal so generated to the pixel array unit 2, the operation of transferring signal charges from the photodiode $11(n+1)$ to the FD unit $16(n+1)$ is terminated. Incidentally, a time period from the time t3 to the time t8 is set as the electric signal accumulation time period of the pixel on the (n+1)-th line.

Then, the signal charge held in the FD unit $16(n+1)$ is converted into a voltage signal to be output by setting the selection pulse $SEL_{(n+1)}$ to be applied to the selection transistor $15n$ at the H level after the completion of the transferring operation executed in the pixel on the (n+1)-th line.

Likewise, in the pixel on the (n+2)-line, the reset pulse $RS_{(n+2)}$ to be applied to the reset transistor $13(n+2)$ and the transfer gate pulse $TG_{(n+2)}$ to be applied to the transfer transistor $12(n+1)$ are set at the H levels for a time period between the times t3 and t4. As a result, useless charges accumulated in the photodiode $11(n+2)$ and the FD unit $16(n+2)$ of the pixel on the (n+2)-th line are removed.

Then, at the time t4, the reset pulse $RS_{(n+2)}$ to be applied to the reset transistor $13(n+2)$ and the transfer gate pulse $TG_{(n+2)}$ to be applied to the transfer transistor $12(n+2)$ are set at the L levels. As a result, accumulation of the signal charges which haven been photoelectric-converted using the photodiode $11(n+2)$ of the pixel on the (n+2)-th line is started.

Then, at a time t9, the transfer gate pulse $TG_{(n+2)}$ to be applied to the transfer transistor $12(n+2)$ is set at the H level to start the operation of transferring the signal charges from the photodiode $11(n+2)$ to the FD unit $16(n+2)$.

In the above mentioned situation, in the pixel on the (n+2)-th line, the H addition amount calculated using the addition amount arithmetic unit 32 will be "$|(2n/2)-(n+2)|\times k=2k$" from the equation (1). Thus, the timing signal generating unit 33 calculates (a+2k) as the electric signal accumulation time period of the pixel on the (n+2)-th line and then generates a timing signal with which the transfer gate pulse $TG_{(n+2)}$ is set at the L level at a time t10 which has passed from the time t4 at which the transfer gate pulse $TG_{(n+2)}$ has been set at the L level by (a+2k). Then, by applying the timing signal so generated to the pixel array unit 2, the operation of transferring signal charges from the photodiode $11(n+2)$ to the FD unit $16(n+2)$ is terminated. Incidentally, a time period from the time t4 to the time t10 is set as the signal charge accumulation time period of the pixel on the (n+2)-th line.

For the convenience of description, the case where shading is corrected by taking only the H addition amount into consideration has been described by way of example. However, shading can be more sufficiently corrected by taking the V addition amount into consideration in addition to the H addition amount.

In the CMOS type image sensor according to an embodiment of the present invention, an electric signal accumulation time period of a pixel disposed in a peripheral area of the pixel array unit where the condensing efficiency is reduced may be possibly increased by calculating the addition amount on the basis of the clocks (the H clock and V clock) indicative of the position of each of the pixels constituting the pixel array unit. Since the electric signal accumulation time period of the pixel disposed on the peripheral area of the pixel array unit where the condensing efficiency is reduced is possibly increased, correction of shading may become possible.

The condensing efficiency may be made uniform over the entire area of the pixel array unit by increasing the electric signal accumulation time period of the pixel disposed in the peripheral area of the pixel array unit where the condensing efficiency is reduced, so that correction of shading may become possible while ensuring the dynamic range.

That is, a method of applying gains to an output signal from a pixel disposed in a peripheral area of a pixel array unit has been proposed in order to correct the shading. However, even when the output signal is amplified with the gains applied thereto, it is hard to ensure sufficient dynamic range because the original number of electric signals is small. On the other hand, in the CMOS type image sensor according to an embodiment of the present invention, the condensing efficiency may be made uniform over the entire area of the pixel array unit and hence shading may be corrected while ensuring the dynamic range.

In addition, in the CMOS type image sensor according to an embodiment of the present invention, an electric signal accumulation time period of a pixel disposed in an area of a lower condensing efficiency (the peripheral area of the pixel array unit) is increased without decreasing an electric signal accumulation time period of a pixel disposed in an area (the central area of the pixel array unit) where a sufficient condensing efficiency is obtained. This means that the condensing efficiency may be made uniform over the entire area of the pixel array unit without decreasing the number of electric signals in the pixel disposed in the area where the sufficient condensing efficiency is obtained.

Incidentally, the condensing efficiency may be also made uniform over the entire area of the pixel array unit by decreasing an electric signal accumulation time period of each pixel disposed in the area (the central area of the pixel array unit) where the sufficient condensing efficiency is obtained. However, in the case that the electric signal accumulation time period of the pixel disposed in the area (the central area of the pixel array unit) where the sufficient condensing efficiency is obtained is reduced, even though the condensing efficient may be made uniform over the entire area of the pixel array unit, the number of obtained electric signals may be reduced. If the number of obtained electric signals is reduced, the sufficient dynamic range may not be ensured. Thus, it will be important to increase the electric signal accumulation time period of each pixel disposed in the area of the low condensing efficiency (the peripheral area of the pixel array unit) in order to make uniform the condensing efficient over the entire area of the pixel array unit while ensuring the sufficient dynamic range.

In view of the above mentioned circumstances, the device according to an embodiment of the present invention may not be preferably applied to a CMOS type image sensor adopting a mechanical shutter (global shutter) for performing a shutter-releasing operation using the whole pixel array unit. The device according to an embodiment of the present invention may be preferably applied to an image sensor adopting a rolling shutter.

This is because it may be necessary for the image sensor adopting the mechanical shutter for performing the shutter-releasing operation using the whole pixel array unit to decrease the electric signal accumulation time period of the pixel disposed in the area where the sufficient condensing efficiency is obtained in order to unify the condensing efficiency over the entire area of the pixel array unit and hence it may become difficult to ensure the sufficient dynamic range. On the other hand, in the CMOS type image sensor adopting the rolling shutter capable of performing the shutter-releasing operation on a pixel by pixel basis or on a line by line basis, the electric signal accumulation time period of the pixel disposed in the low condensing efficiency area may be possibly increased so as to unify the condensing efficiency over the entire area of the pixel array unit.

It may not be necessary for the CMOS type image sensor according to an embodiment of the present invention to install a specific circuit configured to correct shading. Shading correction may be realized simply by incorporating an arithmetic unit configured to adjust an electric signal accumulation time period of a pixel into a circuit of magnitude attained using an existing technique and hence may be readily realized.

In addition, in the CMOS type image sensor according to an embodiment of the present invention, the addition amount is calculated using clocks (an H clock and a V clock) of counters (an H counter and a V counter), so that any memory element configured to store the correction amount of shading may not be necessary.

The present application contains subject matter related to that disclosed in Japanese Priority Patent Application JP 2008-227763 filed in the Japan Patent Office on Sep. 5, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   a pixel array unit in which pixels having photoelectric converting elements configured to accumulate electric signals in accordance with the quantity of received light and detecting units configured to detect the electric signals accumulated using the photoelectric converting elements are arrayed in a matrix; and
   a timing signal generator configured to generate a timing signal with which an electric signal accumulation time period of each of respective pixels constituting the pixel array unit is set to be a time period obtained by adding a time period calculated on the basis of a position where each of the respective pixels constituting the pixel array unit is arranged to a predetermined time period:
   wherein the timing signal generator includes:
   a first counter configured to count a first clock indicative of a vertical position of each of the pixels constituting the pixel array unit,
   a second counter configured to count a second clock indicative of a horizontal position of each of the pixels constituting the pixel array unit, and
   a timing signal generating unit configured to generate the timing signal with which the electric signal accumulation time period of each of pixels constituting the pixel array unit is set to be the time period obtained by adding a time period calculated on the basis of at least one of the first clock counted using the first counter and the second clock counted using the second counter to the predetermined time period.

2. The device according to claim 1, wherein the timing signal generator generates the timing signal used to delay a timing to detect the electric signals using the detecting unit of each pixel by the time period calculated on the basis of the position where each of the respective pixels constituting the pixel array section is arranged.

3. The device according to claim 1, wherein the timing signal generator generates the timing signal used to advance a timing to reset the electric signals accumulated in the photoelectric converting element of each pixel by the time period calculated on the basis of the position where each of the respective pixels constituting the pixel array unit is arranged.

4. A camera comprising:
   the device according to claim 1; and
   an optical system configured to guide incident light to the pixel array unit.

* * * * *